United States Patent
Gustafson

(10) Patent No.: US 8,267,043 B1
(45) Date of Patent: Sep. 18, 2012

(54) CANINE COOLING ASSEMBLY

(76) Inventor: Richard P. Gustafson, Fairland, IN (US)

( * ) Notice: Subject to any disclaimer, the term of this patent is extended or adjusted under 35 U.S.C. 154(b) by 192 days.

(21) Appl. No.: 12/632,881

(22) Filed: Dec. 8, 2009

(51) Int. Cl.
*A01K 29/00* (2006.01)

(52) U.S. Cl. .................................................... 119/28.5

(58) Field of Classification Search .......... 119/417, 119/418, 419, 448, 482, 493, 500, 28.5; 5/421, 5/423, 652.1, 652.2, 724, 726; 62/3.5, 3.2
See application file for complete search history.

(56) References Cited

U.S. PATENT DOCUMENTS

| | | | |
|---|---|---|---|
| 2,493,067 A * | 1/1950 | Goldsmith | 5/726 |
| 2,842,651 A * | 7/1958 | Neely | 219/530 |
| D256,734 S | 9/1980 | Riley | |
| 4,332,214 A * | 6/1982 | Cunningham | 119/28.5 |
| 6,237,531 B1 | 5/2001 | Peeples et al. | |
| 6,263,530 B1 * | 7/2001 | Feher | 5/423 |
| 6,553,935 B1 | 4/2003 | Penner | |
| 6,622,652 B1 * | 9/2003 | Wang | 119/28.5 |
| 6,708,646 B1 | 3/2004 | Wang | |
| 2003/0066489 A1 * | 4/2003 | Whitehill | 119/28.5 |
| 2003/0150060 A1 * | 8/2003 | Huang | 5/726 |
| 2005/0278863 A1 | 12/2005 | Bahlash et al. | |
| 2005/0279286 A1 | 12/2005 | Youngmark | |
| 2006/0272583 A1 | 12/2006 | Brown | |
| 2007/0125313 A1 | 6/2007 | Fleetwood | |
| 2008/0022935 A1 | 1/2008 | Fine | |
| 2008/0060586 A1 | 3/2008 | Lewis, Jr. et al. | |

* cited by examiner

Primary Examiner — T. Nguyen

(57) ABSTRACT

A canine cooling assembly includes a base that has a top side, a bottom side and a peripheral edge. A housing is attached to and covers the top side of the base. The housing includes a bottom wall, a top wall and a perimeter wall that is attached to and extends between the top and bottom walls. The top wall has a plurality of apertures extending therethrough. A blower is in fluid communication with the housing and injects air into the housing to force air outwardly through the apertures. An animal is positionable on the housing to be cooled by air ejected from the apertures.

4 Claims, 4 Drawing Sheets

CANINE COOLING ASSEMBLY

BACKGROUND OF THE DISCLOSURE

Field of the Disclosure

The disclosure relates to an animal cooling devices and more particularly pertains to a new an animal cooling device for quickly cooling an overheated animal such as a canine with a thick coat.

SUMMARY OF THE DISCLOSURE

An embodiment of the disclosure meets the needs presented above by generally comprising a base that has a top side, a bottom side and a peripheral edge. A housing is attached to and covers the top side of the base. The housing includes a bottom wall, a top wall and a perimeter wall that is attached to and extends between the top and bottom walls. The top wall has a plurality of apertures extending therethrough. A blower is in fluid communication with the housing and injects air into the housing to force air outwardly through the apertures. An animal is positionable on the housing to be cooled by air ejected from the apertures There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
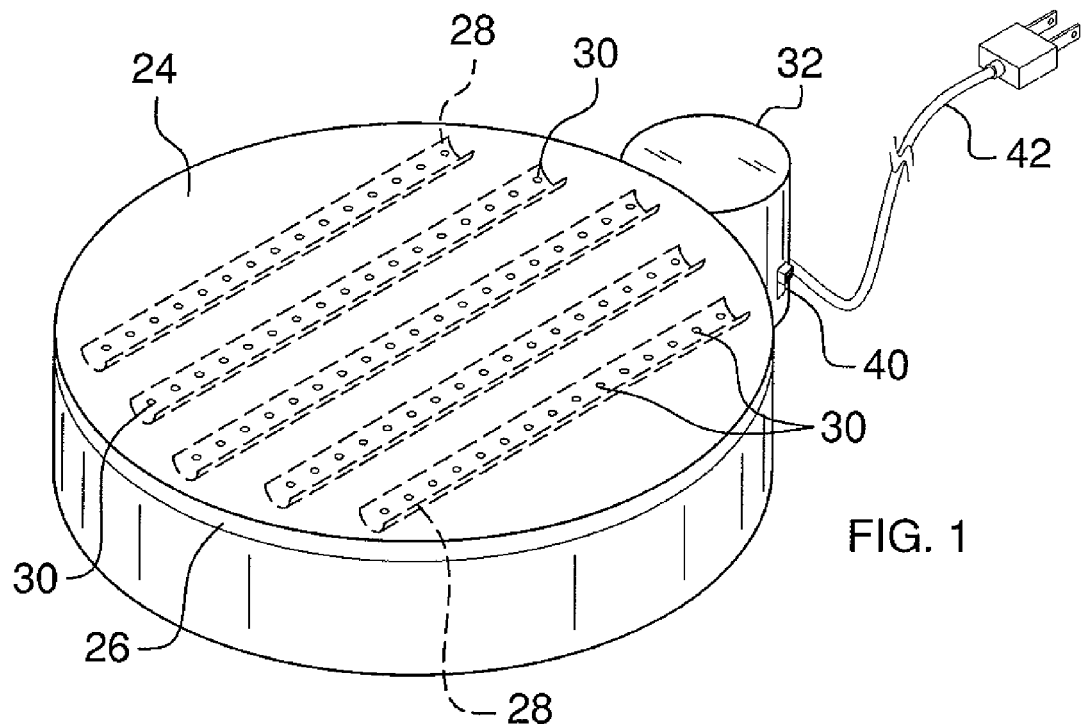
FIG. 1 is a top perspective view of a canine cooling assembly according to an embodiment of the disclosure.
Figure 2:
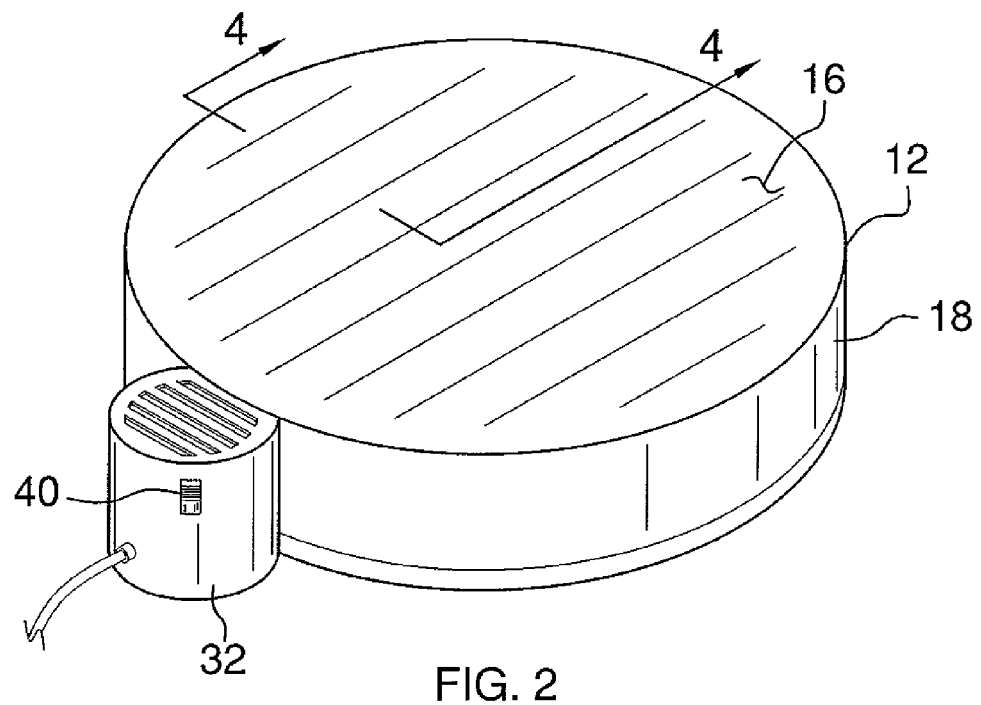
FIG. 2 is a bottom perspective view of an embodiment of the disclosure.

With reference now to the drawings, and in particular to FIGS. 1 through 5 thereof, a new an animal cooling device embodying the principles and concepts of an embodiment of the disclosure and generally designated by the reference numeral 10 will be described.

As best illustrated in FIGS. 1 through 5, the canine cooling assembly 10 generally comprises a base 12 that has a top side 14, a bottom side 16 and a peripheral edge 18. The base 12 is comprised of a resiliently compressible material such as a foamed elastomeric material. The top side 14 has a circular shape. The top side 14 has an area between 1 square foot and 12 square feet.

A housing 20 is attached to and covers the top side 14 of the base 12. The housing 20 includes a bottom wall 22, a top wall 24 and a perimeter wall 26 that is attached to and extends between the top 24 and bottom 22 walls. The housing is comprised of a flexible plastic material having the top 24 and bottom 22 walls being sealed together.

A plurality of conduits 28 is mounted within the housing 20. The conduits 28 abut the top wall 20. The top wall 24 has a plurality of apertures 30 extending therein that are in fluid communication with the conduits 28. The conduits 28 may comprise elongated semi-cylindrical members comprised of a plastic material which facilitate the movement of air from the housing 20 and outwardly of the apertures 30.

A blower 32 is in fluid communication with the conduits 28. The blower 32 injects air into the conduits 28 to force air outwardly through the apertures 30. The blower 32 is positioned adjacent to the peripheral edge 18 of the base 12. The housing 20 may include a sleeve section 34 which extends away from a main section of the housing 20 positioned on the base 12 and which is insertable into the blower 32. The sleeve 34 may be slidably mounted to the blower 32 to allow the housing 20 to move when the weight of animal is placed on the housing 20 without moving the blower 32. The sleeve 34 includes locking rods 36 to retain it within the blower 32.

Figure 3:
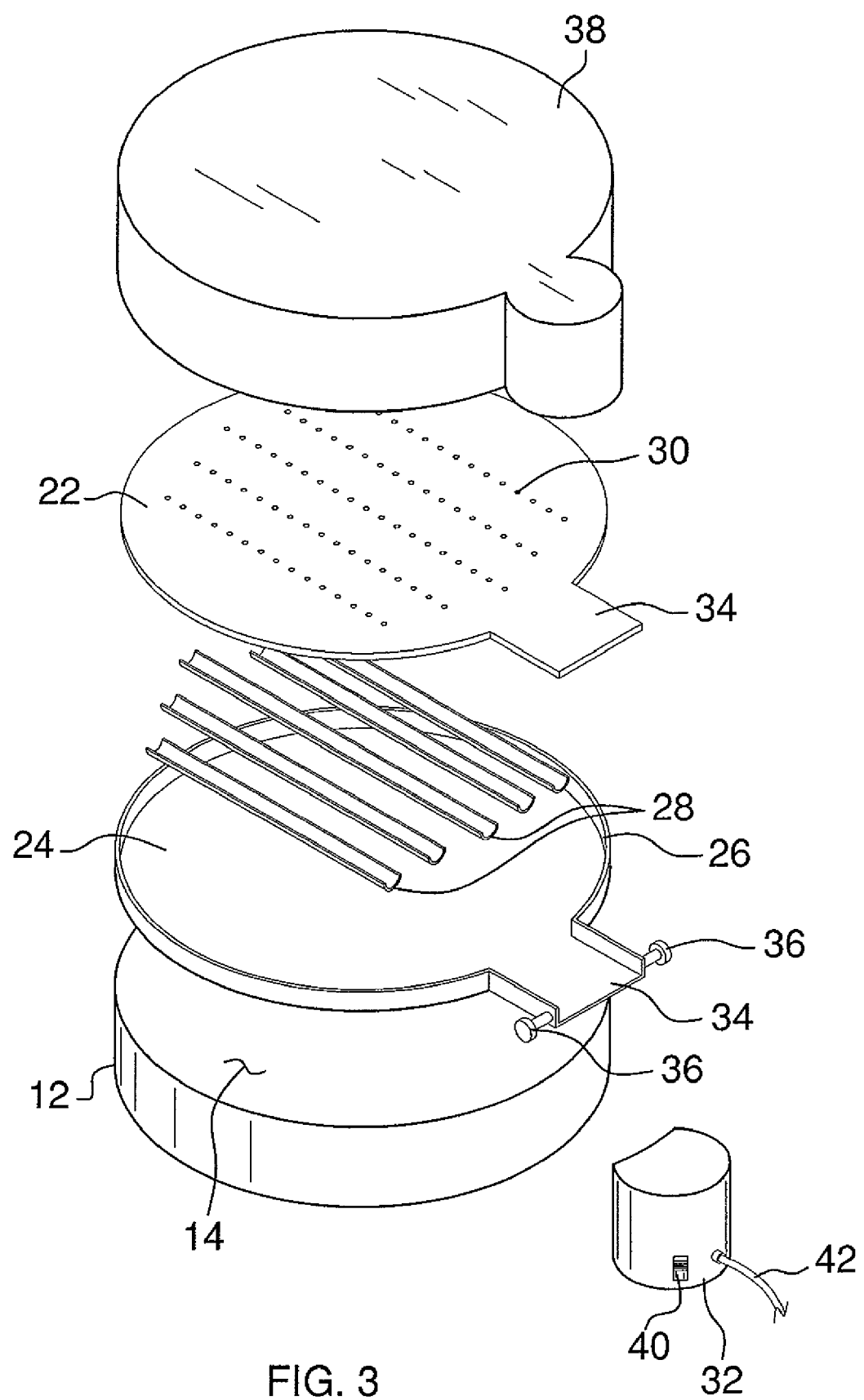
FIG. 3 is a perspective exploded view of an embodiment of the disclosure.
Figure 4:
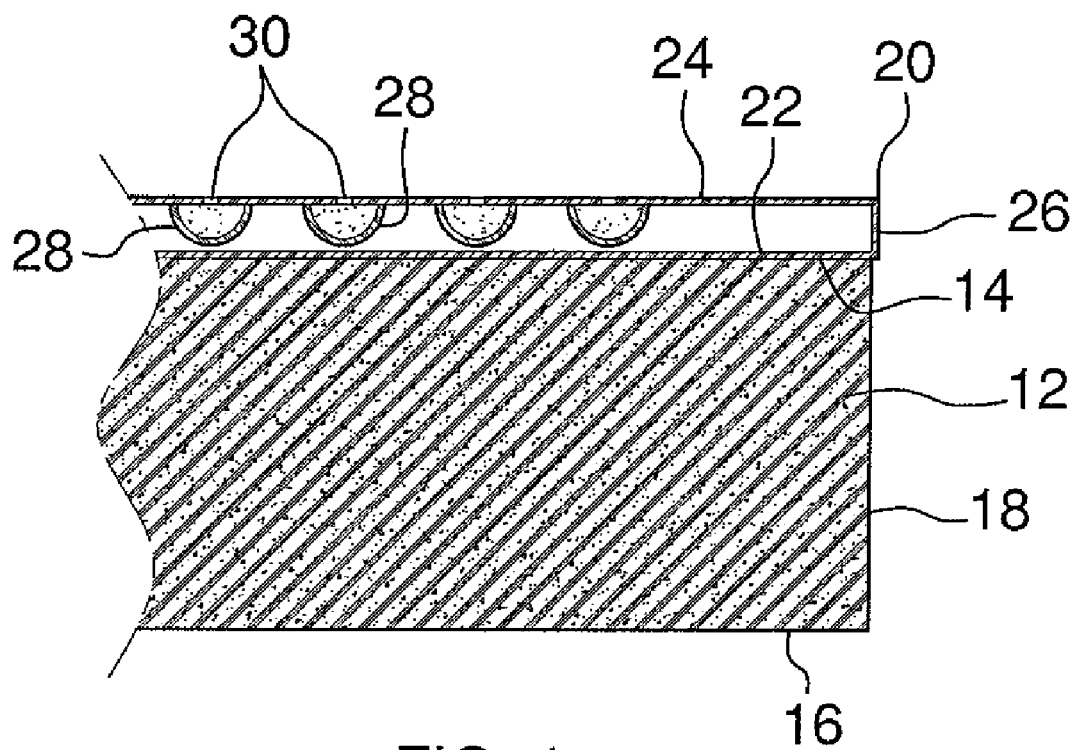
FIG. 4 is a cross-sectional view taken along line 4-4 of FIG. 2 of an embodiment of the disclosure.
Figure 5:
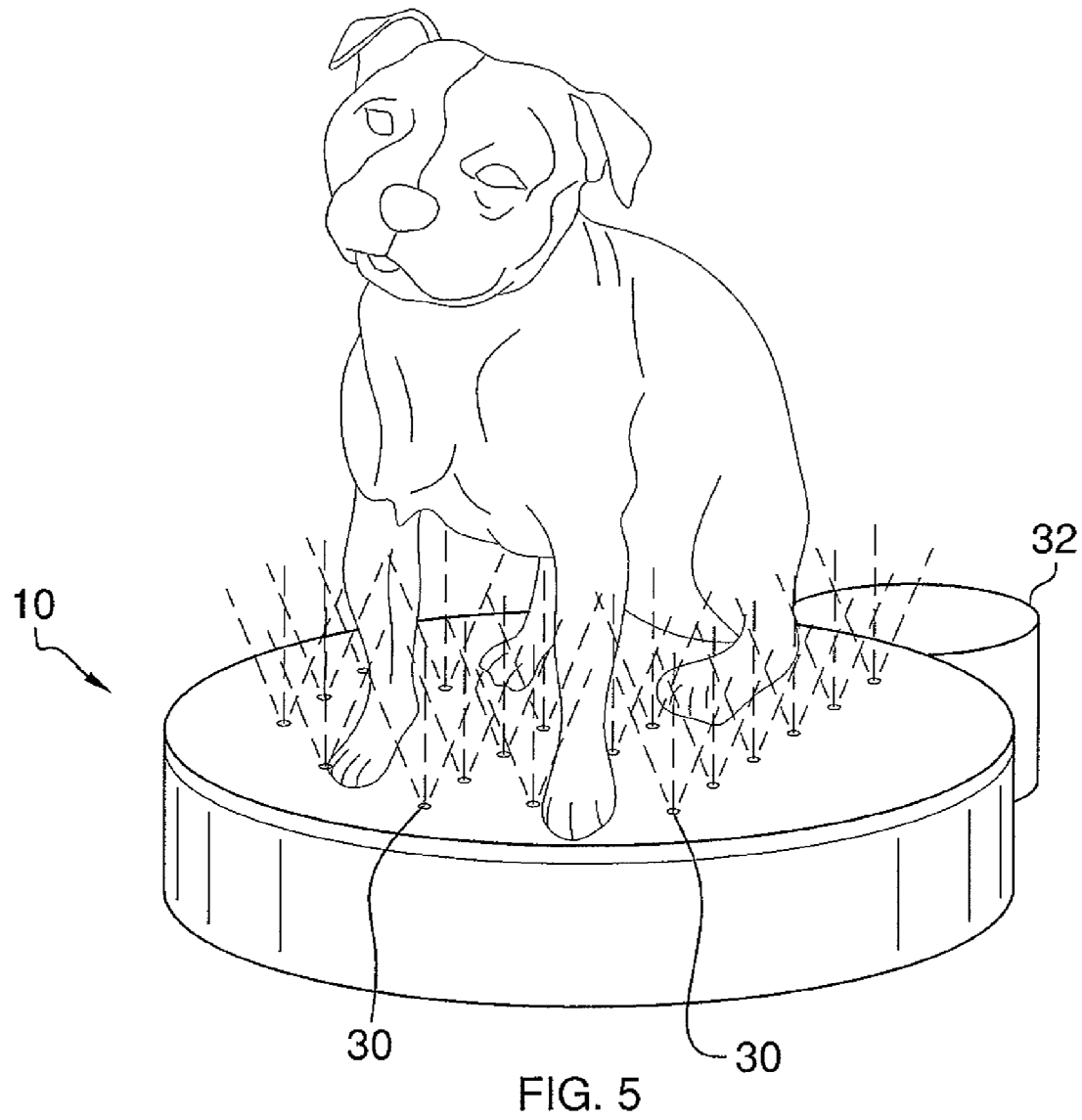
FIG. 5 is a perspective in-use view of an embodiment of the disclosure.

A covering 38 may be removably positioned over and covers the housing 20. The covering 38 is air permeable and may be comprised of a cotton or synthetic cloth material. As shown in FIG. 3, the covering 38 may have a shape to allow both the housing 12 and blower 32 to be covered.

In use, an animal, such as a large dog, is positionable on the housing 20 to be cooled by air ejected from the apertures 30. The blower 32 may include an actuator 40 to turn the blower 32 on or off and may also include a power cord 42 that is pluggable into a conventional power outlet to supply electricity to the blower 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An animal cooling apparatus comprising:
   a base having a top side, a bottom side and a peripheral edge, said base being comprised of a resiliently compressible material;
   a housing being attached to and covering said top side of said base, said housing including a bottom wall, a top wall and a perimeter wall being attached to and extending between said top and bottom walls, said top wall having a plurality of apertures extending therethrough;
   a blower being in fluid communication with said housing, said blower injecting air into said housing to force air outwardly through said apertures;

wherein an animal is positionable on said housing to be cooled by air ejected from said apertures and wherein said housing including a sleeve section extending away from said housing, said sleeve section being inserted into said blower, said sleeve being slidable mounted to said blower and allowing said housing to move relative to said blower.

2. The apparatus according to claim 1, further including a plurality of conduits being mounted within said housing, said apertures being in fluid communication with said conduits and said blower being in fluid communication with said conduits to facilitate movement of air through said apertures.

3. The apparatus according to claim 1, further including a covering being positioned over and covering said housing, said covering being air permeable.

4. An animal cooling apparatus comprising:
- a base having a top side, a bottom side and a peripheral edge, said base being comprised of a resiliently compressible material, said top side having a circular shape;
- a housing being attached to and covering said top side of said base, said housing including a bottom wall, a top wall and a perimeter wall being attached to and extending between said top and bottom walls;
- a plurality of conduits being mounted within said housing, said conduits abutting said top wall, said top wall having a plurality of apertures extending therein and being in fluid communication with said conduits;
- a blower being in fluid communication with said conduits, said blower injecting air into said conduits to force air outwardly through said apertures, said blower being positioned adjacent to said peripheral edge of said base;
- a covering being positioned over and covering said housing, said covering being air permeable;
- wherein an animal is positionable on said housing to be cooled by air ejected from said apertures and wherein said housing including a sleeve section extending away from said housing, said sleeve section being inserted into said blower, said sleeve being slidable mounted to said blower and allowing said housing to move relative to said blower.

\* \* \* \* \*